United States Patent [19]

Feimer et al.

[11] Patent Number: 5,275,726

[45] Date of Patent: Jan. 4, 1994

[54] SPIRAL WOUND ELEMENT FOR SEPARATION

[75] Inventors: Joseph L. Feimer, Sarnia, Canada; Tan-Jen Chen, Baton Rouge, La.; Dean L. Smith, Jr., Mountainside, N.J.; Donald T. Bray; Deborah de la Cruz, both of Escondido, Calif.

[73] Assignee: Exxon Research & Engineering Co., Florham Park, N.J.

[21] Appl. No.: 921,872

[22] Filed: Jul. 29, 1992

[51] Int. Cl.⁵ .............................. B01D 63/10
[52] U.S. Cl. .................. 210/321.74; 240/321.78; 240/321.79; 240/321.83; 240/494.1; 240/497.1
[58] Field of Search ................ 210/321.83, 195.2, 258, 210/321.74, 321.78-

[56] References Cited

U.S. PATENT DOCUMENTS

| | | | |
|---|---|---|---|
| 2,947,687 | 8/1960 | Lee | 210/23 |
| 2,985,588 | 5/1961 | Binning et al. | 210/23 |
| 3,305,595 | 2/1967 | Paulson | 260/674 |
| 3,367,504 | 2/1968 | Westmoreland | 210/321 |
| 3,367,505 | 2/1968 | Bray | 210/321 |
| 3,370,102 | 2/1968 | Carpenter et al. | 260/674 |
| 3,386,583 | 6/1968 | Merten | 210/321 |
| 3,417,870 | 12/1968 | Bray | 210/321 |
| 3,489,647 | 1/1970 | Kolobow | 195/1.8 |
| 3,557,962 | 1/1971 | Kohl | 210/321 |
| 3,962,096 | 6/1976 | Ishu et al. | 210/321 |
| 4,476,022 | 10/1984 | Doll | 210/21.5 |
| 4,568,456 | 2/1986 | van Zon | 210/321.1 |
| 4,650,574 | 3/1987 | Hilgendorff et al. | 210/180 |
| 4,769,263 | 9/1988 | Bitter | 428/36 |
| 4,814,079 | 3/1989 | Schnedier | 210/321.83 |
| 4,837,055 | 6/1989 | Bitter | 427/244 |
| 4,861,487 | 8/1989 | Fulk, Jr. | 210/644 |
| 4,935,139 | 6/1990 | Davidson et al. | 210/490 |
| 5,034,126 | 7/1991 | Reddy et al. | 270/321.74 |
| 5,049,167 | 9/1991 | Castro et al. | 55/16 |
| 5,069,793 | 12/1991 | Kaschemakat et al. | 210/640 |

FOREIGN PATENT DOCUMENTS

| | | |
|---|---|---|
| 219083 | 4/1987 | European Pat. Off. ...... B01D 13/02 |
| 347174 | 12/1989 | European Pat. Off. ...... B01D 13/00 |
| 3421833 | 10/1985 | Fed. Rep. of Germany ......... B01D 13/4 |
| 3430204 | 2/1986 | Fed. Rep. of Germany .... B01D 13 |
| 3518871 | 3/1986 | Fed. Rep. of Germany .... B01D 13 |
| 2642984 | 8/1990 | France ......... B01D 61/18 |
| 1119309 | 5/1985 | Japan ......... B01D 13/04 |
| 3047373 | 2/1988 | Japan ......... B01D 13/02 |
| 3287504 | 11/1988 | Japan ......... B01D 13 |
| 3186313 | 8/1991 | Japan ......... A61M 16/10 |
| 8911328 | 11/1989 | World Int. Prop. O. ... B01D 53/22 |
| 9006805 | 6/1990 | World Int. Prop. O. ... B01D 67/00 |
| 9111249 | 8/1991 | World Int. Prop. O. ... B01D 63/10 |

OTHER PUBLICATIONS

"The Separation Potential of Pervaporation—Part 2. Process Design and Economics" Rautenbach et al, J. Memb. Sci 25 (2985) 25-54.

"Separation of Organic Binary Mixtures by Pervaporation" Rautenbach, et al. J. Memb. Sci 7 (1980) 203-223.

"Permeate Pressure Drop Characteristics of Hollow Fiber & Spiral Wound Pervaporation Modules" Gooding et al, Proceedings of 4th International Conf. on Pervap. Proc. In the Chemical Ind., Dec. 3-7, 1989, pp. 262-269.

"Pervaporation and Gas Permeation-Fundamentals of Process Design" Rautenbach et al, Int'l Chemical Engineering vol. 27, #1 (1987) 10-24.

"Novel Device and Process-Design Concepts For Large Scale Membrane Separation of Hydrocarbon Mixtures" Michaels, et al, 7th World Petroleum Congress, vol. IV 1967 21-29.

"Pervaporation in Hollow Fibers Bundles: Some Aspects of Heat & Mass Transfer" Aptel, J. Memb Sci 1 (1976) 283-305.

"Dependence of Diffusive Permeation Rates on Upstream and Downstream Pressures" Shelden, et al, J. Memb. Sci 4 91978) 115-127.

Primary Examiner—Frank Sever
Attorney, Agent, or Firm—Joseph J. Allocca

[57] ABSTRACT

An improved spiral wound element for separations is disclosed wherein the improvement comprises using as the feed/retentate space one or more layers of a material having an open cross-sectional area in the range 30 to 70% and as the permeate spacer material at least three layers of material two of which are fine and have an open cross-sectional area of about 10 to 50% surrounding a coarse layer having an open cross-sectional area of about 50 to 90%.

16 Claims, No Drawings

SPIRAL WOUND ELEMENT FOR SEPARATION

BACKGROUND OF THE INVENTION

Summary of the Invention

An improved spiral wound membrane element comprising layers of membrane material fluid tight sealed along 3 edges enclosing a permeate spacer creating at least one permeate envelope upon which a feed/retentate spacer layer is laid, along at least one membrane face, the entire multi layer arrangement being wound around a hollow central mandrel (which may be closed at one end) and to which the permeate envelope is in fluid communication through the fourth unsealed edge, creating a spiral wound module element is disclosed which is useful in separation processes wherein a pressure gradient is maintained across the membrane from a feed side to a permeate side, the improvement comprising using as the feed/retentate spacer at least one layer of a material having an open cross-sectional area of at least 30-70% and using as the permeate spacer at least three layers of material characterized in that the outer layers are a fine material having an open cross-sectional area of about 10 to 50% and a coarse layer having an open cross-sectional area of about 50 to 90% interposed between the aforesaid fine outer layers and wherein the fine outer layers are in interface contact with the membrane layers enclosing the permeate spacer.

DESCRIPTION OF THE RELATED ART

Spiral wound elements contain permeate and retentate spacers as a routine matter of standard element design, see, e.g. U.S. Pat. No. 3,417,870. Various attempts have been made to improve the spacer materials. Thus. U.S. Pat. No. 4,861,487 describes a low pressure drop spacer composed of generally parallel elongated filaments positioned generally parallel to the flow direction of the feed stream and wherein the elongated filaments are connected by shorter bridge filaments which are placed at an angle to the flow of the feed stream to provide for a low pressure drop. European Patent Application 89305966.7 (publication number 347174) describes a spiral wound membrane cartridge wherein the feed spacer material having a plurality of parallel ribs extending in an axial direction, interconnected by a matrix of smaller filaments generally perpendicular to the parallel ribs which results in a reduction to the flow resistance. WO91/11249 describes a spiral wound element which utilizes a divided central mandrel and a permeate region which employs a high density porous spacer flanked on two sides with low density porous spacers.

U.S. Pat. No. 5,069,793 describes a spiral wound element for use in pervaporation designed to produce maximum permeate flow throughput per element volume. This is achieved by use of a permeate spacer selected to take advantage of the fact that the total permeate flow throughput from a module passes through a maximum as the resistance to vapor transport of the permeate spacer material is progressively decreased. The capability of the permeate spacer material to transport permeating vapor from the membrane surface to the permeate collection pipe is expressed as a normalized conductivity, or permeate vapor flow, per unit pressure drop in the permeate channel, per unit trans-membrane flux. The permeate channel is defined to use a spacer material such that permeate flow throughput is 60-90% of the maximum possible value. The permeate spacer can be a sheet of material having a cross-sectional thickener which varies, giving from relatively thin at the far edge to thick at the edge adjacent the central mandrel. Alternatively the spacer can be made of multiple layers of the same or different spacer material.

DESCRIPTION OF THE INVENTION

In a spiral wound membrane separation element comprising a hollow central mandrel (which may be closed at one end) around which are wound multiple layers of membrane, feed spacers and permeate spacers wherein layers of membrane surround a permeate spacer, said membrane layers being fluid tight sealed along 3 edges producing a permeate envelope leaf, wherein multiple permeate envelope leaves are attached along their fourth unsealed edge in fluid communication with the interior of the hollow central mandrel, and a layer of feed/retentate spacer material extends along the outer surfaces of each permeate envelope leaf, the spiral winding of multiple permeate envelope leaves/feed-retentate spacers being wrapped with an outer wrap layer to prevent unwinding and the end of the winding being capped by an anti-telescoping device attached at the downstream end to prevent telescopic displacement of the spiral wound layers during use, the improvement comprising using as the feed/retentate spacer material at least one layer of a material having an open cross-sectional area of at least about 30 to 70%, preferably 30 to 50%, preferably using two layers of material placed between adjacent permeate envelope leaves, which feed/retentate spacer material can be of either the same or different material and of the same or different cross-sectional area, preferably such feed/retentate spacer material being insulated from the membrane surface by an interposed layer of chemically and thermally inert woven or non-woven fabric about 1 to 15 mils thick having a weight of about 0.5 to 10 oz/sq. yard and a Frazier air permeability in the range 0.5 to 1000 cfm/sq. foot at $\frac{1}{2}$ inch water pressure, (example of a non-woven material being Nomex), such that upon winding the multiple permeate envelope leaves and interposed multiple feed/retentate spacer layer one obtains two layer of feed/retentate spacer material between adjacent permeate envelope leaves in the winding, and using as the permeate spacer three or more layers of material, the outer layers which are in contact with the membrane (i.e. with the membrane surface per se or with the integral backing of the membrane if the membrane is cast on a backing, this backing not being counted as one of the spacer layers) being a fine material having an open cross-sectional area of at least about 10 to 50%, preferably at least about 10 to 30% and interposed between the fine outer layers will be coarse layers having an open cross-sectional area of at least about 50 to 90%, preferably about 60 to 90%. The multilayer permeate spacer comprises at least 3 layers but may comprise 3 to up to 7 layers alternating fine and coarse provided that the outer layers in contact with the membrane are fine material layers. It is preferred that an odd number of layers be used to minimize intermeshing but an even number of layers can also be employed in which case it is preferred that the layers be of materials of different mesh size so as to prevent or minimize intermeshing of the layers. The limit on the number of layers used in fabricating the permeate spacer layer in each permeate envelope leaf, the thickness of each leaf, the length of each leaf, the number of leaves attached to the central mandrel and the number and thickness of the feed/retentate spacer between adjacent permeate envelope leaves will be set as a compromise among competing factors including the ability to ultimately wind the assembly around the central mandrel, the pressure drop along the length of each permeate envelope leaf as well as across the feed spacer and the membrane surface area obtainable in each spiral wound module.

If too many layers are used or if the layers used are too thick it will become difficult to wind the spiral wound element. Also, obviously too thick a permeate envelope will negatively impact on the total membrane surface area available in the final spiral wound element of a given diameter.

The preferred number of permeate spacer layers is 3 to 5.

The multi-layer permeate spacer may be sized slightly smaller in its dimensions than the membrane layer surrounding it so that the spacer does not intrude into the area between the membranes at the three edges along which the membrane layers are fluid tight sealed. Intrusion of permeate spacer into this area interferes with the ability to effectively seal the membrane edges to create the permeate envelope.

The preferred number of feed/retentate spacer layers is 2. In preparing the element it has been found that interposing a layer of chemically and thermally stable woven or non-woven material about 1 to 15 mils thick weighing about 0.5 to 10 oz/sq. yard and having a Frazier air permeability in the range 0.5 to 1000 cfm/sq. ft at ½ inch water pressure interposed between the feed/retentate spacer material and the surface of the membrane and the permeate spacer material and the surface of the membrane improves membrane element long term performance and improves the vacuum tightness of the resulting spiral wound package. This interposing layer acts as a shield between the membrane surface and the feed/retentate spacer layer and/or permeate spacer. For low temperature applications polyethylene, polypropylene, nylon, etc. felt can be used as the shield. For high temperature applications the choice is more limited, with polyamide (e.g. Nomex which is a blend of high temperature nylon and polyester), teflon, fiberglass or mixtures thereof being suitable candidates.

This/these shield layers are not included in the count of permeate spacer layer or feed/retentate spacer layers. When used on the feed side the shield layer protects the membrane from being punctured by the feed spacer; when used on the permeate side it protects the membrane from the support mesh/permeate spacer layers.

The layer of feed/retentate material extended on the surface of at least one face of the permeate envelope is substantially equivalent in its dimensions in term of length and width to the permeate envelope.

Adhesives are used in preparing the spiral wound element. Different adhesives for different types of applications and environments have been identified and are described in U.S. Pat. No. 4,464,494 and U.S. Pat. No. 4,582,726 incorporated herein by reference. Various other adhesives such as high temperature epoxy (e.g. Tra-bond 2125 from Tra-Con or Duralco 4400, 4525, 4700, 4703 from Cortronics Corp.) or non-epoxy adhesives (e.g. alumina/zirconia/ceramic adhesives such as Resbond 903 HP, 904 Zirconia, 904 Quartz and 906 Magnesia from Cortronics Corp.) may also be used.

The spiral wound module wrapped in its outer wrap and fitted with the anti-telescoping device can be inserted into a pressure vessel having an internal diameter equal to the exterior diameter of the module, and long enough to hold from one to any number of modules in series, said pressure vessel being fitted with feed entrance/retentate exit means and separate manifold means for recovering permeate from the open end of the hollow central mandrel. Alternatively, multiple modules can be installed in parallel within a single containment vessel as described in U.S. Pat. No. 4,083,780.

In producing the spiral wrapped modules of the present invention having feed/retentate and permeate spacers as described various materials of construction can be used to meet the required spacer characteristics.

The feed/retentate spacer can be a woven mesh material or a non-woven mesh material, e.g., a first layer of parallel spaced apart filaments covered by a second layer of parallel spaced apart filaments laying perpendicular or diagonally to the first layer wherein the filaments of the first and second layer are attached to each other at their points of contact, such a material hereinafter referred to as non-interwoven filament material.

When using such mesh materials as the feed/retentate spacer the spacer will comprise a single layer or multiple layers of material fat least one of which is 16 to 80 mesh, preferably 16 to 60 mesh, more preferably 20 to 60 mesh and between 10 to 30 mils thick preferably 17.25 mils thick. For ease of fabrication it is preferred that 2 layers of material be used as the feed/retentate spacer both layers being preferably made of the same material. Use can be made of different mesh sizes to prevent intermeshing. If more than 3 layers are used, the layer in contact with the faces of the membranes would be a finer material and the layer between these face contacting layers would be a coarser material within the aforesaid limits, e.g.. the fine layers could have a 50 to 80 mesh while the coarser layer could have a 20 to 50 mesh. The material(s) used will be such as to provide a feed spacer having an open cross-sectional area of at least 30 to 70%, preferably about 30 to 50%. As previously stated, it is preferred that the membrane and the feed/retentate spacer be separated from direct contact by an insulating layer of chemically and thermally inert woven or non-woven fabric such as Nomex.

A problem encountered when using multiple elements in series is that the feed/retentate flow rate through the end elements is low since a significant portion of the feed would have permeated across the membrane in the first few elements. This results in low feed velocity through the end elements and the performance of these elements is compromised. The low velocity through the end elements is aggravated when a relatively high open area aluminum (30 mesh—0.01" wire diameter—49% open area) screen is used as the feed spacer in the spiral wound element design. This screen gives low feed-to-retentate pressure drop, which is an important consideration with six elements in series. With this element design, the overall pressure drop across the elements and with two intermediate heat exchangers used to reheat the feed is expected to be less than 15 psi.

The feed velocity through the elements can be increased by using a lower open area screen as the feed spacer. An example of such a material would be 50 mesh—0.0090" wire diameter stainless steel screen which has an open area of 30%. When two layers of this screen are used as the feed spacer, the feed-to-retentate pressure drop is 4.6 psi at 10 kg/min feed rate. This represents a significant increase in pressure drop versus the previously identified design with a single layer of 30 mesh aluminum feed spacer. Although the 2×50 mesh screen design is excellent for increasing the feed velocity thus creating turbulence, a disadvantage is that the overall pressure drop when using multiple elements, e.g.. with six elements in series and two intermediate heat exchangers, is well over 40 psi if this element design were used. Since it is necessary to maintain at least 10 psi pressure on the retentate, it would then be necessary to operate the lead element at over 50 psi inlet pressure. This is not acceptable since this would exceed the maximum tolerable pressure of pervaporation spiral wound elements which is around 40 psi.

In a preferred pervaporation process the elements are staged by using increasingly higher pressure drop feed spacers in order to get high feed velocity through the end elements. With this staged pervaporation process, a relatively high open area feed spacer such as 30 mesh aluminum would be used for the first four elements while a relatively low open area feed spacer such as 2×50 mesh stainless steel would be used for the last two elements. With this combination, the overall pressure drop for the system is expected to be less than 25 psi, which would be acceptable. More importantly it can also be expected that the performance of the end elements to be greatly improved since the feed velocity would be high.

Another example would be to use 30 mesh aluminum as the feed spacer for the first two elements, 40 mesh aluminum feed spacer for the second two elements, and 2×50 mesh stainless steel feed spacer for the last two elements. Needless to say, there are numerous other ways to stage the elements with increasingly higher pressure drop feed spacers in order to achieve the desired high velocity through the end elements.

This use of increasing pressure drop feed/retentate spacers in the down stream elements of multiple spiral wound elements in series should also be useful for reverse osmosis and ultrafiltration wherein the performance is especially sensitive to feed velocity.

The permeate spacer material used can also be selected from the aforesaid woven or non-interwoven filament materials. As previously stated the spacer comprises an assembly of three or more layers, alternating fine and coarse material. The fine material which supports the membrane and prevents intrusion into the permeate spacer can be a woven or non-interwoven filament material having at least a 50 mesh or finer, preferably 60 to 300 mesh, more preferably 60 to 150 mesh, still more preferably 80 to 120 mesh, most preferably 100 to 120 mesh and about 3 to 15 mils thick. The coarse material can also be a woven or non-interwoven filament material having less than a 80 mesh, preferably less than 50 mesh, more preferably less than 35 mesh, most preferably less than 20 mesh, and from 10 to 30 mils thick preferably from 17-25 mils thick, it being understood that in practice the fine material used will have a finer mesh than the coarse material used. Likewise when using fine mesh material in the 200-300 mesh range it is preferred that the coarse layer be in the 30 to 80 mesh range when the element is to be used at elevated temperature and pressure.

The permeate spacer can comprise 3 or more layers. When 3 layers are employed two layers of fine material (support layers) are used in contact with the membrane layer and a coarse layer is interposed between the two fine layers. If 4 layers of spacer material are used, the two outer layers in contact with the membrane are still the fine material support layer and coarse material constitute the two inner layers interposed between the two fine outer layers. Care should be taken when using this 4 layer embodiment to insure that the two coarse layers which are in contact with each other either have different cross-sectional profiles or of the same cross-sectional profile are out of register one with the other to insure that the coarse materials do not intermesh with each other which if that happened would result in a substantial reduction in the open cross-sectional area of the materials available of permeate flow. In such an intermesh situation flow would be inhibited and an undesired pressure drop across the permeate spacer resulting in reduced flux would be encountered. If five layers are employed they would be arranged in a fine/coarse/fine/coarse/fine sequence wherein the three fine layers could be the same or different materials of the same or different fine cross-sectional area, within the previous definition of fine material; likewise the two coarse layers could be the same or different materials of the same or different coarse cross-sectional area, again within the previous definition of coarse material.

The spacer materials can be made from any plastic or metal, e.g., polyester, polysulfone, polyester, nylon, teflon, etc., or fiber glass, or stainless steel, aluminum or brass etc. In general any material which will be chemically inert and thermally stable in the intended environment of use of the final element can be employed as a material of construction. It is preferred however that the spacer material be made of metal, e.g. aluminum or stainless steel and more preferably that it be steel especially in the case of the fine mesh material. In order to insure optimum operability of the final element the spacer should be capable of preventing membrane intrusion into the permeate space under the pressures employed. This ability to prevent membrane intrusion has been correlated to spacer stiffness. An available measure of stiffness is the tensile modulus of elasticity. The stiffness of a number of common spacer materials is presented below:

| Polyester | $2-3 \times 10^5$ lbs/sq. inch |
| Aluminum | $10 \times 10^6$ lbs/sq. inch |
| Stainless steel | $28 \times 10^6$ lbs/sq. inch |

Thus, in the present invention the fine permeate spacer support material, in addition to having the recited open cross sectional area, has a stiffness of at least about $2-3 \times 10^5$ lbs/sq. inch, preferably at least about $10 \times 10^6$ lbs/sq. inch, most preferably at least about $28 \times 10^6$ lbs/sq. inch and higher, the fine permeate spacer support material being most preferably stainless steel.

The stiffer material provides better support which eliminates or minimizes intrusion which in turn minimizes permeate pressure drop. This is especially true at operating conditions (i.e. in permeate at 140°+C.). This is to be compared to the performance of a less stiff material such as polyester. Because of the low stiffness factor of polyester, both the membrane and the polyester support are pushed into the permeate spacer channels, especially at higher temperatures and/or pressures. Thus if one considers material stiffness with mesh size, a finer material of greater stiffness can be used with a more coarse layer than can a similar fine mesh material of lesser stiffness.

For example while a 200 mesh aluminum support may work satisfactorily with an 80 mesh coarse layer, the 200 mesh aluminum support would not be satisfactory with a 17.50 mesh coarse layer. However, a 200 mesh stainless steel support would be satisfactory with a 30-80 mesh layer because of its greater stiffness. Specific selections of materials within the aforesaid recitations are left to the practitioner to make with consideration being paid to the temperature and pressure of element application and the design or target permeate pressure drop across the element.

When the element is to be used for pervaporation it is preferred that the fine material used as permeate spacer support be in the 60 to 150 mesh, preferably 80 to 120 mesh range 5 to 15 mils thick and be of stainless steel while the coarse material has a mesh size of less than 50 mesh and is 15 to 30 mils thick.

In addition to the woven or non-interwoven filament materials previously described, the spacer materials having the necessary cross-sectional areas can be materials which exhibit no mesh but rather are spaced apart ribs running in parallel on a thin solid support sheet. Such sheets can be fabricated by casting or extruding with the aforesaid ribs cast or extruded as integral parts of the sheet. Alternatively individual filaments can be deposited on a pre-existing sheet. The channels defined by the spaces between the parallel ribs or filaments and the height of the ribs or filaments would provide the cross-sectional areas falling within the aforesaid definitions. Use of such materials would require that the sheets be oriented in the permeate envelope such that the channels would be aligned in the direction of permeate flow in the envelope into the hollow central mandrel.

By the practice of the present invention performance of the spiral wound element in terms of both flux and selectivity is nearly identical to that of the membrane when used by itself, uninfluenced by any hydrodynamic effects introduced by spacer materials.

The present invention is especially useful in the separation of aromatics from non-aromatics, such as in heavy cat naphtha separation, intermediate cat naphtha separation, light cat naphtha separation etc.

Membranes which are useful in such separations include polyurea urethane disclosed and claimed in U.S. Pat. No. 4,914,064, polyurethane imides disclosed and claimed in U.S. Pat. No. 4,929.358, polyester imides disclosed and claimed in U.S. Pat. No. 4,944,880, isocyanurate crosslinked polyurethane membranes, disclosed and claimed in U.S. Pat. No. 4,983,338 and U.S. Pat. No. 4,929,357, polyester membranes disclosed and claimed in U.S. Pat. No. 4,976,868, preferably the polyester imides of U.S. Pat. No. 4,944,880 and U.S. Pat. No. 4,990,275, all of which are incorporated herein by reference. Polyacrylate membranes may also be used. Acrylic acid ester homopolymers or their copolymers with each other or with acrylic acid can be formed into membranes. The acrylic acid monomer units can be in free-acid form or partly or totally neutralized with metal or alkylammonium ions. The membranes can be covalently or ionically crosslinked.

It has been found that membranes, such as the polyester imide membranes which when used in aromatics/non-aromatics separation processes such as heavy cat naphtha separation lose performance overtime due to the build up of a corrosion deposit layer (e.g. iron sulfide) on the membrane can be restored to their original performance levels by soaking the membrane in a gasoline dispersant/detergent, which is a surface active material having a molecular weight in the range from 500 to 3000. The dispersant/detergent has a backbone which can be polybutene or polypropylene, bearing with functional groups comprising ether amines, hydrocarbonyl amines, hydrocarbonyl amides or mixtures thereof. As example of a useable membrane regeneration detergent/dispersant is CS-3 Kerofluid available from BASF.

It is also important in membrane separation processes especially pervaporation processes that the membranes be defect free. The presence of holes in membranes can significantly decrease membrane selectivity performance. It has been found that micro defects in pervaporation membranes can be identified before module or element assembly by brushing the surface of the membrane with a liquid such as heptane and pulling a vacuum or just brushing the surface of the membrane with a water, isopropyl alcohol (IPA) mixture (e.g. 50/50 by weight). Heptane or IPA passing through the defects wet the backing of the membrane upon which the membrane is cast resulting in translucent spots thus identifying the defect which can be patched by applying glue over the defect area.

The present invention is illustrated in the following non-limiting examples.

EXAMPLE 1

An element wherein the feed/retentate and permeate spacers consisted of 14 mesh polyester (the permeate spacer being separated from the membrane by layers of Tricot 8846 polyester serving as membrane support) was compared with an improved element within the scope of the present invention wherein the 14 mesh polyester permeate spacer was sandwiched between layers of 80 mesh stainless steel as support, (no Tricot 8846 polyester support layer being employed) and wherein the feed/retentate spacer was a 33 mesh Teflon. Tricot 8846 is available from Hornwood Inc. of Maryland. It is a woven fabric 4 mils thick having wales of 48 strands per inch and courses of 58 stands per inch. This fabric is coated with epoxy having a resin pick-up of 16%.

The two elements were evaluated for the separation of heavy cat naphtha at 100° C. and 10 mbars permeate pressure using a polyurea/urethane membrane.

The membrane was prepared as follows:

A solution containing a polyurea-urethane polymer is prepared. Four point five six (4.56) grams (0.00228 moles) of polyethylene adipate (MW—2000), 2.66 grams (0.00532 moles) of 500 MW polyethylene adipate and 3.81 grams (0.0152 moles) of 4,4'diphenylmethane diisocyanate are added to a 250 ml flask equipped with a stirrer and drying tube. The temperature is raised to 90° C. and held for 2 hours with stirring to produce an isocyanate-end capped prepolymer. Twenty grams of dimethylformamide is added to this prepolymer and the mixture is stirred until clear. One point five grams (0.0076 moles) of 4,4'diamino-diphenylmethane is dissolved in ten grams of dimethylformamide and then added as a chain extender to the prepolymer solution. This mixture was then allowed to react at room temperature (approx. 22° C.) for 20 minutes. This solution was diluted to 5 wt % such that the solution contained a 60/40 wt % blend of dimethylformamide/acetone. The solution was allowed to stand for one week. The viscosity of the aged solution was approximately 35 cps. After this period of time one wt % Zonyl FSN (Dupont)

fluorosurfactant was added to the aged solution. A microporous teflon membrane (K-150 from Gore) with nominal 0.1 micron pores, 75% porosity cast on a non-woven Nomex/polyethylene terephthalate backing, the combination being 4 mils thick was coated with the polymer solution in a continuous operation. The coating was dried in an oven heated to 60° C. This technique produced a composite membrane with a polyurea/urethane layer between 3 to 4 microns in thickness.

The results of the evaluation are presented in Table 1.

TABLE 1

PERFORMANCE DIFFERENCE BETWEEN PERVAPORATION ELEMENT DESIGNS

| Spiral Wound Element Design | | |
|---|---|---|
| Permeate Spacer support/Mesh Size | Yes/Tricot 8846 | Yes/80 mesh Stainless Steel |
| Permeate Spacer Mesh Size | 14 | 14 |
| Feed Spacer Mesh Size | 14 | 33 |
| Element Performance (1) | | |
| Selectivity, Delta RON | 8.1 | 10.2 |
| Flux, Kg/M2-Day | 31 | 48 |

(1) At 100° C. and 10 mbars permeate pressure.

As can be seen the table, with the spiral wound design using polyester tricot spacer support, a selectivity of 8.1 was achieved. In contrast, with the spiral wound design using stainless steel spacer support, a selectivity of 10.2 was achieved. In aromatics/saturates separation, selectivity is measured by the octane difference between the permeate and the feed. The flux also improved significantly. It can be expected that the performance difference between the packages will be even greater at higher temperatures since flux would be significantly higher.

After the evaluation of element performance using heavy cat naphtha was completed, studies directly measuring the flow characteristics of the permeate spacers were made. For these studies the outer wrap layer around the element was removed and the permeate envelope of one leaf was carefully opened to the atmosphere along the sealed edge furthest removed from and parallel with the hollow central mandrel. Various vacuum levels were then drawn on the hollow central mandrel and the resulting air flow rates through the permeate spacer were measured. The data are presented in Table 1B.

TABLE 1B

Comparison of Flow Characteristics of Permeate Spacer Designs

| vacuum level in central mandrel | measured flow rate, l/min (air at STP) | |
|---|---|---|
| (i.e. pressure drop in permeate spacer), mm Hg | element with polyester tricot support layer | element with stainless steel support layer |
| 4.0 | 4.0 | |
| 7.6 | 6.8 | |
| 14.7 | 11.3 | |
| 16.2 | - | 25.1 |
| 27.9 | 11.9 | |
| 32.1 | | 36.8 |
| 46.0 | | 46.4 |
| 50.8 | 30.3 | |
| 54.0 | 19.3 | |
| 76.2 | 38.5 | |
| 127. | 53.5 | |
| 140. | 62.3 | |

The data show that for a given pressure drop, the air flow through element with the stainless steel support layer is significantly greater than for the element with the polyester Tricot 8846 support layer. A spacer flow resistance parameter can be calculated from a linear regression of the data. For the element, employing the polyester Tricot layer the parameter is 2.30 mm Hg/(1/min of STP air) while for the element employing the stainless steel layer it is 0.96 mm Hg/(1/min of STP air). A low value of the flow resistance parameter is desirable since it indicates reduced permeate pressure drop and thus that lower average permeate absolute pressure exists. For pervaporation, lower permeate absolute pressure is associated with higher selectivity and higher flux.

EXAMPLE 2

A separate example was performed to determine the effect of feed/retentate spacer open cross-sectional area and thickness on permeator performance.

Four elements were fabricated. Each element used the same polyester-imide membrane material, which was made by first endcapping one part of 2000 molecular weight polyethylene adipate (PEA) with two parts of pyrometallic dianhydride (PMDA) and then reacting one part of the endcapped polymer with methylene dianiline (MDA) to form a polyamic acid. The polyamic acid was then coated onto a 0.1 micron teflon sheet as previously described in Example 1. The viscosity of the polyamic acid was in the range of 90-150 cps at room temperature. After the polyamic acid was deposited onto the teflon sheet, the polyamic acid was cured at 260° C. for 7.25 minutes. The permeate spacer used consisted of five layers of screens, 120 mesh stainless steel/17 mesh aluminum/120 mesh stainless steel/17 mesh aluminum/120 mesh stainless steel.

The four elements were evaluated on heavy cat naphtha at 140° C. and 10 mbar permeate pressure.

Feed spacer of various open cross-sectional area (mesh) and thickness were, used. The results are presented in Table 2.

TABLE 2

EFFECT OF FEED SPACER ON PERVAPORATION ELEMENT PERFORMANCE

| Feed Spacer | | | | |
|---|---|---|---|---|
| Screen Size, Mesh | 67 | 33 | 18 | 14 |
| Thickness, Mils | 10 | 21 | 17 | 33 |
| Element Selectivity | | | | |
| Delta RON | 8.9 | 10.2 | 11.8 | 8.1 |

It is seen that with thick/coarse spacer (33 mils/14 mesh) the element performance is low because feed velocity is relatively low at a given flow rate. Conversely with a thin/fine spacer (10 mils/67 mesh) element because of high pressure drop the performance, while improved over that achieved with the thick/coarse spacer is not as high as obtained with a spacer of more moderate thickness/and a coarseness between fine and coarse.

The feed spacer in permeation elements, therefore, advantageously ranges from 16 to 80 mesh, preferably 16 to 60 mesh, more preferably 20 to 60 mesh and from 10 to 30 mils thick, preferably 17-25 mils thick.

EXAMPLE 3

To further illustrate the effectiveness of the improved element design, several elements were fabricated and tested for the pervaporative separation of heavy cat naphtha. All test elements employed the same membrane material, the polyester imide of Example 2 cast on the same teflon membrane backing as previously described.

Four sample elements were fabricated, A, B, C and D.

Element A employed single layers of 14 mesh polyester as both the feed spacer and permeate spacer. When used as the permeate spacer it was isolated from the membrane surfaces by two layers of polyester felt spacer support (Tricot 8846), one layer on each side of the permeate spacer, to prevent damage to the membrane layers by the coarse permeate spacer during element fabrication.

Elements B, C and D used multiple layers of permeate spacer material which were isolated from the membrane surfaces by intervening layers of Nomex, and either single or multiple layers of feed spacer material between adjacent permeate envelope leaves, in all cases the feed spacer material being a finer material having a mesh greater than 20.

Table 3 presents the details of the feed and permeate spacers used in each of the four membrane elements and indicated the selectivity of each element in terms of delta MON (motor octane number) of the resulting permeate.

The elements were all tested in a recirculating pilot plant with heavy cat naphtha at 140° C., 15 psi feed pressure and 10 mbars permeate pressure. The effectiveness of each element was assessed by measuring the difference in the motor octane number (delta MON) between the permeate and the feed. Flux was not compared because the HCN used in the tests had been exposed to oxygen which negatively effects the flux performance of the membranes.

When used by itself in a flat circular test cell without any feed or permeate spacers the membrane supported by a fine sintered porous metal support, under the same conditions exhibited a selectivity in terms of ΔMON of about 12.9.

As can be seen from Table 3, Element A exhibited a selectivity in terms of ΔMON of 9.9, which is 3.0 MON lower than the membrane by itself.

In comparison preferred elements B, C and D of the present invention using stiffer spacer material and finer/stiffer feed/retentate spacer material exhibited selectivity in terms of ΔMON ranging from 11.7 to 12.4. in all cases an element efficiency of over 90%.

It is expected that if the membrane was placed directly on the 14 mesh polyester permeate spacer without any fine mesh support intervening layer between the membrane and the 14 mesh polyester spacer, the membrane would fully embed into the permeate spacer, resulting in severely degraded performance, or be punctured by the spacer, resulting in inoperability.

TABLE 3

| | PERFORMANCE OF PERVAPORATION ELEMENT | | |
|---|---|---|---|
| ELEMENT NO. | FEED SPACER ARRANGEMENT | PERMEATE SPACER ARRANGEMENT | SELECTIVITY, DELTA MON |
| A | 14 MESH PE | PE FELT (Tricot 8846) 14 MESH PE PE FELT Nomex | 9.9 |
| B | 33 MESH AL 33 MESH AL | 120 MESH SS 17 MESH AL 17 MESH AL 120 MESH SS | 11.7 |
| C | 33 MESH AL | Nomex Nomex 100 MESH SS 17 MESH AL 100 MESH SS 17 MESH AL 100 MESH SS Nomex | 11.7 |
| D | 50 MESH SS 50 MESH SS | Nomex 100 MESH SS 17 MESH AL 100 MESH SS 17 MESH AL 100 MESH SS Nomex | 12.4 |

(1) Delta MON Selectivity of PEI Membrane alone is 12.9
(2) PE: Polyester

EXAMPLE 4

A number of spiral wound element packages were prepared to evaluate the effect of putting a non-woven shield layer between the membrane and the feed/retentate spacer layers. Each element used the same membrane as described in Example 2. The results are presented below:

| Element | I | II |
|---|---|---|
| Feed Spacer Arrangement | 50 mesh SS 50 mesh SS | Nomex 50 mesh SS 50 mesh SS Nomex |
| Permeate Spacer Arrangement | Nomex 100 mesh SS 17 mesh AL 100 mesh SS 17 mesh AL 100 mesh SS Nomex | Nomex 100 mesh SS 17 mesh AL 100 mesh SS 17 mesh AL 100 mesh SS Nomex |
| Vacuum Drop Time (min) | 4 | 21 |

The vacuum drop time is a measure of the tightness of the spiral wound element package. In this test a 29" Hg vacuum is pulled on the element. The vacuum pump is then turned off. The pressure inside the element rises. The vacuum drop time is the time which it took the element to go from 29" to 22" Hg vacuum. The longer the vacuum drop time, the tighter is the element.

Elements II and III were evaluated for vacuum drop time and also for the pervaporative separation of heavy cat naphtha. The pervaporation test was conducted on heavy cat naphtha initially at 140° C. for 2 to 10 days and then at 150° C. for 20 to 21 days and 10 mm Hg vacuum pressure at a flow rate of 1300 lbs/hour. The results from the 150° C. runs are reported in detail below.

| Element | III | II |
|---|---|---|
| Feed Spacer Arrangement | 30 mesh AL | Nomex 50 mesh SS 50 mesh SS Nomex |
| Permeate Spacer Arrangement | Nomex 100 mesh SS 17 mesh AL 100 mesh SS | Nomex 100 mesh SS 17 mesh AL 100 mesh SS |

-continued

| Element | III | II |
|---|---|---|
| | 17 mesh AL | 17 mesh AL |
| | 100 mesh SS | 100 mesh SS |
| | Nomex | Nomex |
| Vacuum Drop Time (min.) | 4 | 21 |
| Days on Oil at 150° C. | 20 | 21 |
| Initial Flux (kg/m²/day) | 288 | 229 |
| Flux drop per day (%) | −0.27* | 0.24* |
| Initial Permeate RONC | 100.5 | 100.4 |
| Permeate RONC Drop per day (%) | −0.087 | −0.018* |

*Not Statistically Significant
(RONC - Research Octane Number Clear)

As can be seen from the table above, at 150° C. high temperature operation element III with no Nomex showed higher initial performance, higher flux at constant selectivity as compared to element II which has Nomex on the feed side. However, element III showed significant loss in selectivity with days on oil whereas element II showed no statistically significant loss in selectivity with days on oil. The flux stabilities of both elements were satisfactory.

In the above elements the 50 mesh SS is 11 mils thick, the 100 mesh SS is 9 mils thick, the 17 mesh AL is 23 mils thick, the 30 mesh AL is 24 mils thick. The Nomex layer is a non woven fabric from Veratek Inc. The Nomex is identified as Nomex 1019 and is composed of a mixture of polyamide and polyester. It is 4.6 mils thick, has a weight of 3 oz/sq. yard and a Frazier air permeability of 2.5 cfm/ft² at ½ inch water pressure. The elements were assembled using Tra-bond 2125 adhesive using 9 parts resin to 1 part catalyst as per manufacture recommendations. A diluent was added to make it less viscous. The diluent was Santicizer 160 plasticizer from Monsanto which is butyl benzyl phthalate used at 10% diluent 90% Tra-bond 2125. No surface treatment was needed for the permeate spacers although the central tube was wiped with B.F. Goodrich A-934-BY primer to remove any grease or dirt.

What is claimed is:

1. A spiral wound membrane element comprising layers of membrane material fluid tight sealed along three edges enclosing a permeate spacer creating at least one permeate envelope which is contacted along at least one membrane face with a feed-retentate spacer, the entire multi-layer arrangement being wound around a hollow central mandrel and with which the permeate envelope is in fluid communication through its fourth unsealed edge thereby creating a spiral wound element, wherein the feed-retentate spacer comprises at least one layer having an open cross-sectional area of at least 30 to 70% and wherein the permeate spacer comprises at least three layers characterized in that the outer layers of the three layers are a fine material having an open cross-sectional area of about 10 to 50% and a stiffness of at least $2-3 \times 10^5$ lbs/sq. inch and a coarse layer having an open cross-sectional area of about 50 to 90% is interposed between the aforesaid fine outer layers and wherein the fine outer layers are in interface contact with the membrane layers enclosing the permeate spacer.

2. The spiral wound membrane element of claim 1 wherein the feed/retentate spacer comprises at least two layers of material placed between adjacent permeate envelope leaves.

3. The spiral wound membrane element of claim 2 wherein the feed retentate spacer material used are the same or different material and are of the same or different cross-sectional area.

4. The spiral wound membrane element of claim 3 wherein the feed/retentate spacer material has an open cross-sectional area of at least about 30 to 50%.

5. The spiral wound membrane element of claim 1 wherein the fine permeate spacer material has an open cross-sectional area of at least about 10 to 30%.

6. The spiral wound membrane element of claim 1 wherein the coarse permeate spacer material has an open cross-sectional area of at least 60 to 90%.

7. The spiral wound element of claim 1 wherein the feed/retentate spacer is a material of 10 to 80 mesh and 15 to 30 mils thick.

8. The spiral wound membrane element of claim 1 wherein the permeate spacer comprises up to 7 layers of material alternating fine and coarse layers, with the fine layers being the outer layers in contact with the membrane.

9. The spiral wound membrane element of claim 8 wherein the permeate spacer comprises an odd number of layers.

10. The spiral wound membrane element of claim 1 wherein the fine layer of material of the permeate spacer has at least a 50 mesh and is about 5 to 15 mils thick.

11. The spiral wound membrane element of claim 1 wherein the coarse layer of material of the permeate spacer is less than 50 mesh and is about 15 to 30 mils thick.

12. The spiral wound membrane element of claim 1 wherein the feed/retentate spacer material and the permeate spacer material are woven or non-interwoven filament material.

13. The spiral wound membrane element of claim 1 wherein the fine permeate spacer material has a stiffness of at least about $10 \times 10^6$ lbs/sq. inch.

14. The spiral wound membrane element of claim 12 wherein the feed/retentate spacer material and the permeate spacer material is steel.

15. The spiral wound membrane element of any one of claims 1, 2, 3, 4, 5, 6, 7, 8, 9, 10, 11, 12, 13 or 14 wherein a layer of chemically and thermally stable material about 1 to 15 mils thick weighing between about 0.5 to 10 oz/sq. yard and having a Frazier air permeability in the range 0.5 to 1000 cfm/sq. ft. at ½ inch water pressure is interposed between the feed/retentate spacer and the membrane.

16. The spiral wound membrane element of any one of claims 1, 2. 3, 4, 5, 6, 7, 8, 9, 10, 11, 12, 13 or 14 wherein a layer of chemically and thermally stable material about 1 to 15 mils thick weighing between about 0.5 to 10 oz/sq. yard and having a Frazier air permeability in the range 0.5 to 1000 cfm/sq. ft. at ½ inch water pressure is interposed between the membrane and the fine support-permeate spacer layer.

* * * * *